United States Patent
Akerblom

(10) Patent No.: US 6,622,544 B2
(45) Date of Patent: Sep. 23, 2003

(54) MEASURING DEVICE IN WHICH A MEASURING HEAD IS MOVABLY SUPPORTED

(76) Inventor: Bengt Akerblom, Vårby Allé 23, S-143 40 Vårby (SE)

( * ) Notice: Subject to any disclaimer, the term of this patent is extended or adjusted under 35 U.S.C. 154(b) by 0 days.

(21) Appl. No.: 10/169,999

(22) PCT Filed: Jan. 11, 2001

(86) PCT No.: PCT/SE01/00017
§ 371 (c)(1),
(2), (4) Date: Jul. 12, 2002

(87) PCT Pub. No.: WO01/51882
PCT Pub. Date: Jul. 19, 2001

(65) Prior Publication Data
US 2003/0000286 A1 Jan. 2, 2003

(30) Foreign Application Priority Data
Jan. 14, 2000 (SE) .............................. 0000105

(51) Int. Cl.[7] .................. G01B 13/06; G01B 13/16; G01B 13/12; G01N 37/00
(52) U.S. Cl. ........................................ 73/37.5
(58) Field of Search .............. 73/37.5, 105, 866.5

(56) References Cited

U.S. PATENT DOCUMENTS

| 3,802,086 A | * | 4/1974 | Walker .................. 33/174 R |
| 3,884,076 A | | 5/1975 | Studer ..................... 73/37.6 |
| 4,195,446 A | * | 4/1980 | Angst ................... 51/105 GG |
| 4,325,249 A | | 4/1982 | Berglund ................. 324/226 |
| 4,607,525 A | * | 8/1986 | Turner et al. .............. 73/37.5 |
| 4,607,960 A | * | 8/1986 | Wulff ......................... 374/7 |
| 4,647,855 A | | 3/1987 | Berglund ................. 324/226 |
| 4,658,633 A | * | 4/1987 | Freer ....................... 73/37.5 |
| 4,854,156 A | | 8/1989 | Hoeffel et al. ............. 73/37.5 |
| 4,876,883 A | * | 10/1989 | Ecoffey et al. ............. 73/37.5 |
| 4,977,777 A | * | 12/1990 | Bieg ....................... 73/37.5 |
| 5,184,503 A | * | 2/1993 | Hancock ................. 73/37.5 |
| 5,361,615 A | * | 11/1994 | Kirii et al. .................. 72/19 |
| 5,386,716 A | * | 2/1995 | Thurston et al. ........... 73/37.5 |
| 5,719,342 A | * | 2/1998 | Borchers et al. ......... 73/866.5 |
| 5,753,799 A | * | 5/1998 | Shah .......................... 73/40 |
| 5,756,908 A | * | 5/1998 | Knollmeyer et al. ...... 73/866.5 |
| 5,829,928 A | * | 11/1998 | Harmand et al. .......... 408/83.5 |
| 5,922,941 A | * | 7/1999 | Winkler et al. .............. 73/40 |

* cited by examiner

Primary Examiner—Hezron Williams
Assistant Examiner—David J. Wiggins
(74) Attorney, Agent, or Firm—Young & Thompson

(57) ABSTRACT

A measuring device (1) has a measuring housing (5) in which a measuring head (6) is movably supported, the measuring housing having at least one connection (13) for the supply of pressurized air for supporting by air the measuring head (6) in the measuring housing (5). The measuring head is designed to let out air and to generate an air cushion towards a measuring object (3). On the measuring head (6) there is provided at least one guide element (20) that is extending axially and protrudes into a chamber (12) in the measuring housing (5), the guide element gliding in and being supported by air in a channel (21) in a guide part (15), which forms an end wall to the chamber (12). Also a shaft (16) included in the measuring head extends through and is supported by air in the guide part (15).

8 Claims, 2 Drawing Sheets

MEASURING DEVICE IN WHICH A MEASURING HEAD IS MOVABLY SUPPORTED

TECHNICAL FIELD

The present invention relates to a measuring device according to the precharacterizing clause of Patent claim 1.

STATE OF THE ART

In many situations, for measuring material thicknesses for example, use is made of a type of measuring device in which a measuring head is supported movably in a measuring housing and the measuring head is held at a certain distance from a measurement object by means of air which is blown out between the measuring head and the measurement object and there forms an air cushion. By means of such an air cushion, the gap between the measuring head and the measurement object can be kept small and constant, which is advantageous for measuring accuracy.

It is also important for the measuring accuracy, however, that the measuring head is easily movable in the measuring housing, which is usually mounted in a fixed manner. Supporting the measuring head by means of air makes it possible for the measuring head to move easily in the measuring housing, but, in order to achieve sufficiently good mobility and thus the possibility of good measuring accuracy, it is also necessary for electric wires between the measuring head and the measuring housing to be made very flexible so as to afford low movement resistance of the measuring head. This in turn results in these wires being very delicate and in relative rotation between the measuring head and the measuring housing having to be limited so as not to damage the wires.

Against this background, it has been proposed that the measuring housing be provided with axial grooves and the measuring head be provided with heels fitting these grooves in order in this way to limit relative rotation between the measuring head and the measuring housing. In this connection, however, problems of friction between the grooves and the guide heels arise in certain working positions of the measuring device, in spite of the measuring head being supported by air. Having a measuring head and a measuring housing of noncircular cross section has also been tried in order in this way to limit relative movement between them, but problems of friction have also arisen in this case and led to impaired measuring accuracy.

OBJECT OF THE INVENTION

An object of the invention is to produce an improved measuring device which makes possible increased reliability and increased measuring accuracy. Another object is to achieve this by simple means.

SUMMARY OF THE INVENTION

The object of the invention is achieved by means of a measuring device having the features indicated in Patent claim 1.

By providing the measuring head with axial guide means which run in axial channels in the measuring housing, it is possible, by means of air, to hold the guide means in an easy-running manner in the channels in changing working positions of the measuring device. In this way, good mobility of the measuring head in different situations is ensured. The embodiment selected also makes manufacture and assembly of the measuring device easier.

Further features and advantages of the invention emerge from the description and patent claims below.

The invention will be described in greater detail below by means of an exemplary embodiment shown in the appended drawing.

DESCRIPTION OF EXEMPLARY EMBODIMENT

Figure 1:
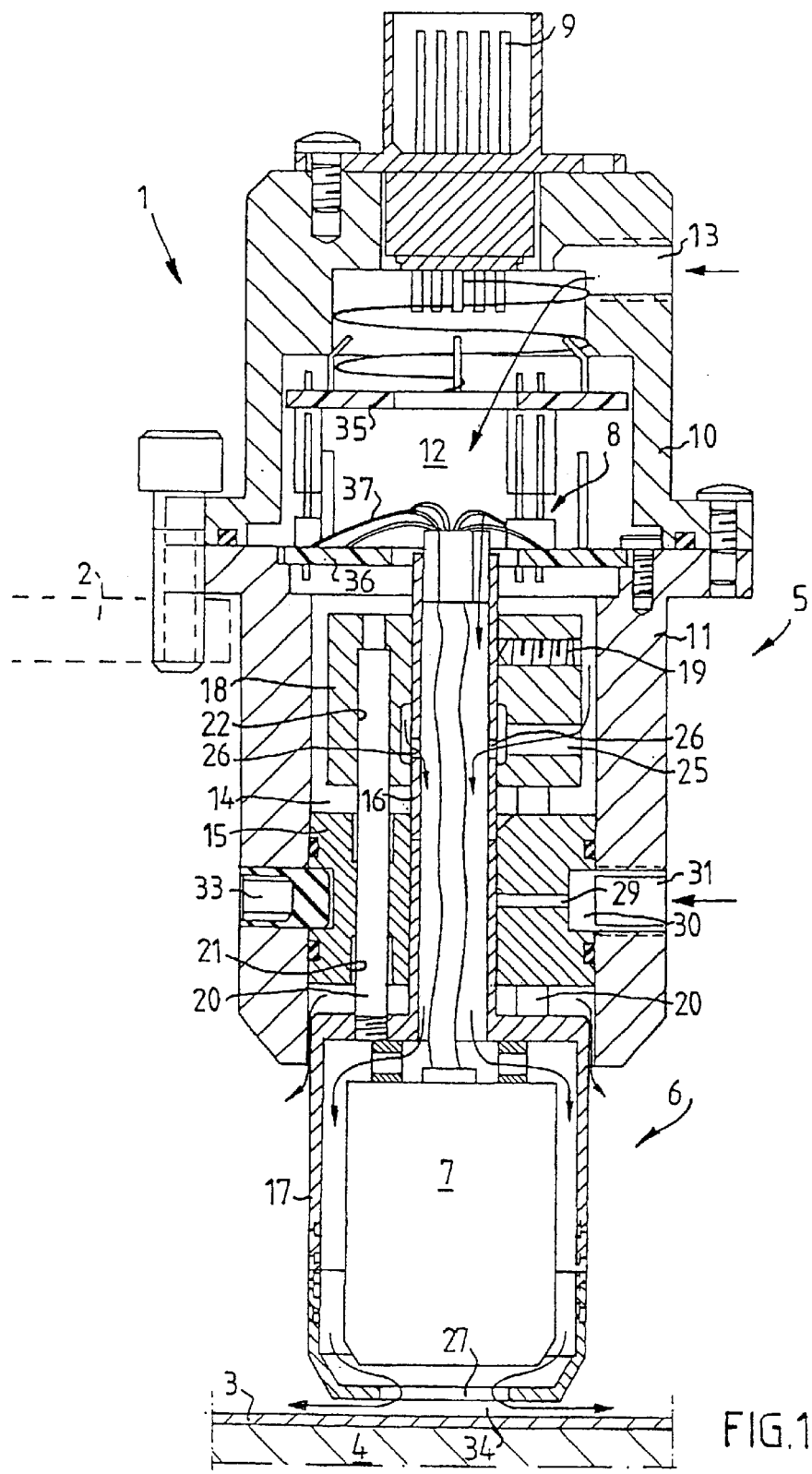
FIG. 1 shows a vertical section in various planes through a measuring device according to the invention.

A measuring device 1 according to the invention shown in FIG. 1 is mounted in a stand 2 for measuring the thickness of a material web 3 which is supported by a surface 4, for example in the form of a roller in a production plant for the material web 3. The measuring device 1 includes a measuring housing 5 and, arranged movably therein, a measuring head 6, in which a transducer 7 is connected, via a wire arrangement 8, to a contact device 9 which is arranged in the measuring housing 5 and via which the measuring device 1 can be connected to a measurement system for handling measurement signals from the transducer 7, which can work according to, for example, the reluctance principle, or in another manner.

As can be seen from FIG. 1, the measuring housing 5 is made from two housing parts, namely an upper housing part 10 and a lower housing part 11, which are joined together in a sealed manner and together delimit a chamber 12, to which pressurized air can be supplied via a connection 13. The chamber 12 is delimited at the bottom by a housing end wall, in this case a guide part 15 which is mounted in a sealed manner in an axial bore 14 in the lower housing part 11 and through which a tubular shaft 16 on a housing 17 runs, which housing forms part of the measuring head 6 and fits in the bore 14. Mounted at the top of the shaft 16 is a body 18 which is fixed by means of one or more locking screws 19. Fastened at the top of the housing 17 are two rod-shaped guide elements 20, each running through its own channel 21 in the guide part 15 and each resting in its own recess 22 in the body 18. In this way, the housing 17, the shaft 16, the two guide elements 20 and the body 18 together form the movable measuring head 6 which can be displaced axially in the measuring housing 5.

Figure 2:
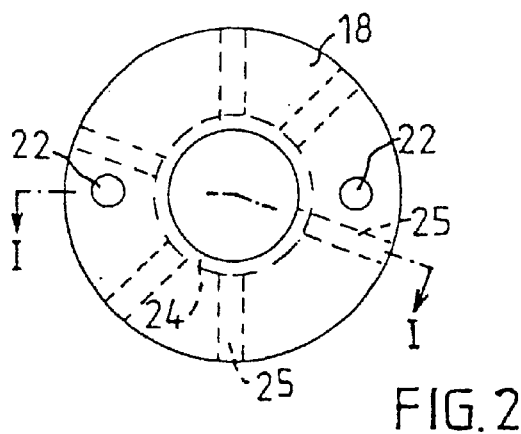
FIGS. 2–4 show vertical views of various parts in FIG. 1, showing the section planes in FIG. 1.
Figure 3:
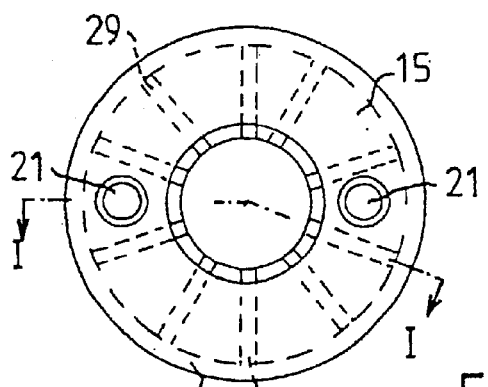
Figure 4:
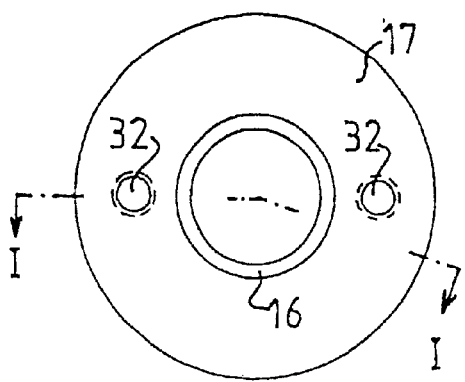

It can be seen in greater detail from the lines I—I in FIGS. 2–4 how the sections through the components 18, 15 and 17, respectively, shown in FIG. 1 are positioned.

FIG. 2 shows that the body 18 is provided with a central hole 23 for the shaft 16. In the wall of this hole, there is an annular groove 24 from which a number of radial channels 25 open in the outer surface of the body 18. By virtue of the fact that the body 18 is intended to be mounted with its groove 24 directly in front of a number of holes 26 arranged in the shaft 16, it is possible to supply air from the chamber 12 to the interior of the shaft 16 via the channels 25. This air passes, together with air which can flow into the shaft 16 at the top, down into the housing 17 and can, via at least one opening 27 at the bottom in the latter, flow out towards the material web 3 so as to form a desired air cushion.

FIG. 3 shows that the guide part 15 is provided with a central hole 28 for the shaft 16. From this hole, a number of radial channels 29 lead out to a circumferential groove 30 arranged in the outer surface of the guide part 15. On both sides of this groove 30, there are grooves for sealing means, and the guide part 15 can in this way be arranged in a sealed manner in the lower housing part 11, with the groove 30 directly in front of a connection 31 for supplying pressurized air. The shaft 16 runs in the hole 28 with a certain play, and, in the same way, the guide elements 20 run with a certain play in their respective channels 21. In this way, by means of air from the chamber 12 and air from the channels 29, the shaft 16 is supported in the hole 28 by air, which means that the shaft can be displaced in a virtually friction-free manner in the guide part 15. In a corresponding manner, by means of air from the chamber 12, the guide elements 20 are supported in the channels 21 by air, which means that these can also be displaced in a virtually friction-free manner in the guide part 15. At the same time, by means of the guide elements 20, the measuring head 6 is prevented from being rotated in the measuring housing 5.

It can be seen from FIG. 4 that the housing 17 with its shaft 16 is provided with two threaded fastening holes 32 located essentially diametrically opposite one another, each for its own guide element 20. As can be seen from FIG. 1, the housing 17 has a slightly smaller diameter than the bore 14 in the lower housing part 11, as a result of which air which flows through the guide part 15 can continue out into the open and at the same time form an air support for the housing 17. The guide part 15 is fixed in the lower housing part 11 by means of at least one screw 33 which is arranged in a sealed manner therein and extends into the groove 30 in the guide part 15.

The air flow in the measuring device 1 is shown by various, unnumbered arrows in FIG. 1, the air entering via the connections 13 and 31 and then continuing so that it flows on the one hand through and on the other hand past the housing 17.

The mass of the body 18 is adapted to the mass of the housing 17 with contents in such a manner that the body 18 forms a sufficiently great counterweight which is capable of reducing the tendency to inclination between the measuring head 6 and the measuring housing 5 when the measuring device 1 is mounted in different working positions. In this way, more effective support by means of air is made possible, with reduced friction and improved accuracy as a result.

The upper part of the measuring head 6 can be said to form a piston which is movable in the chamber 12 in the measuring housing 5. By selecting a sufficiently great air pressure in the chamber 12, the measuring head 6 can be made to tend to move out of the measuring housing 5 even when the measuring device 1 is mounted upside down in relation to the position shown in FIG. 1. A suitable air flow through the opening 27 in the measuring head 6 then produces a desired gap 34 between the measuring head 6 and the material web 3. The size of this gap can suitably be roughly 30–100 $\mu$m. In those cases where the material web 3 is resting on a surface 4 in the form of a roller, that end of the housing 17 facing the material web 3 suitably has a curvature which corresponds to the curvature of the roller, as a result of which the air cushion can be stabilized further and the measuring accuracy can be improved. The measuring head 6 also advantageously has a certain mobility in the lateral direction relative to the measuring housing 5, so that a limited relative inclination is possible in order to allow the measuring head to position itself correctly relative to the material web 3 and the surface 4 in the event of any relative displacement between the measuring housing 5 and the surface 4.

The wire arrangement 8 shown in FIG. 1 includes an upper contact device 35 which is mounted in the upper housing part 10 and can be connected to a lower contact device 36 which is mounted in the lower housing part 11 and, via a number of flexible wire elements 37, is connected to the wires of the transducer 7 which are located in the shaft 16. In this way, the upper housing part 10 can, if necessary, be removed from the lower housing part 11 without the relatively delicate wire elements 37 being damaged.

The embodiment described above can of course be varied in a number of different ways, as required and desired, within the scope of the invention. For example, the number of guide elements 20 and their positioning and embodiment can be different. It is also possible, for example, to reduce the extent to which the measuring head 6 projects from the measuring housing 5 in order to protect the measuring head better from lateral forces and in this way to produce a more robust embodiment. Likewise, for example, the number of air channels and their positioning can be selected in a manner different to that shown here.

What is claimed is:

1. Measuring device, having a measuring housing (5) which is intended for fixing in a stand and in which a measuring head (6) is movably supported and has an end portion which projects from the measuring housing and is designed so as to rest via an air cushion against a measurement object (3), the measuring housing (5) being provided with at least one connection (13) for the supply of pressurized air for supporting by means of air the measuring head (6) in the measuring housing (5), and the measuring head being designed to blow out air and form an air cushion towards the measurement object (3), and being wire-connected to the measuring housing for signal transmission and limitedly rotatable relative to the measuring housing on account of guide elements, characterized in that the measuring head (6) has at least one guide element (20) which is oriented in the axial direction of the measuring housing (5) and protrudes into a chamber (12) in the measuring housing (5) and which runs in and is supported by air in a channel (21) in a guide part (15) which forms an end wall to the chamber (12), and in that a shaft (16) forming part of the measuring head (6) also extends through and is supported by air in the guide part (15).

2. Measuring device according to claim 1, characterized in that the measuring head (6) has at least two guide elements (20) which are separate from one another, are oriented in the axial direction of the measuring housing (5) and protrude into the chamber (12) in the measuring housing, each element running in and being supported by air in its own channel (21) in the guide part (15), and in that the shaft (16) is arranged between the guide elements (20).

3. Measuring device according to claim 2, characterized in that the shaft (16) and the guide elements (20) are mutually connected in the chamber (12).

4. Measuring device according to claim 2, characterized in that the guide elements (20) are arranged essentially diametrically opposite one another, each on its own side of the shaft (16).

5. Measuring device according to claim 1, characterized in that the guide element(s) (20) and the shaft (16) are air-supported by means of air from the chamber (12).

6. Measuring device according to claim 5, characterized in that the shaft (16) is also air-supported by means of air which is introduced essentially radially into the guide part (15).

7. Measuring device according to claim 1, characterized in that the measuring head (6) is provided with at least one outlet opening (27), facing towards the intended measurement object, for air which is intended to form an air cushion towards the measurement object, and in that the shaft (16) forms a supply channel for this air from the chamber (12).

8. Measuring device according to claim 1, characterized in that the measuring head (6) is, inside the chamber (12), provided with a piston arrangement (16, 18, 20) which is dimensioned so as, in interaction with the pressure in the chamber (12), to impart to the measuring head a movement out of the measuring housing (5) in different mounting positions thereof.

\* \* \* \* \*